United States Patent
Kitoh et al.

(10) Patent No.: US 6,616,715 B2
(45) Date of Patent: Sep. 9, 2003

(54) BATTERIES HAVING DESIRED WORKING VOLUME RATIOS OF POSITIVE AND NEGATIVE MATERIALS

(75) Inventors: Kenshin Kitoh, Nagoya (JP); Hiroshi Nemoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/871,260

(22) Filed: May 31, 2001

(65) Prior Publication Data

US 2001/0026885 A1 Oct. 4, 2001

Related U.S. Application Data (62) Division of application No. 09/272,909, filed on Mar. 19, 1999, now Pat. No. 6,506,515.

(30) Foreign Application Priority Data

Mar. 23, 1998 (JP) ............................................. 10-73792

(51) Int. Cl.$^7$ ................................................ H01M 4/00
(52) U.S. Cl. ........................ 29/623.1; 429/164; 429/94
(58) Field of Search ......................... 29/623.1; 429/164, 429/94

(56) References Cited

U.S. PATENT DOCUMENTS

| | | | |
|---|---|---|---|
| 3,862,861 A | 1/1975 | Mcclelland et al. | |
| 5,322,746 A | 6/1994 | Wainwright | |
| 5,716,728 A | 2/1998 | Smesko et al. | |
| 5,746,780 A | 5/1998 | Narukawa et al. | ............. 429/94 |
| 6,001,139 A | 12/1999 | Asanuma et al. | ......... 429/231.1 |
| 6,506,515 B1 * | 1/2003 | Kitoh et al. | ................. 429/164 |

FOREIGN PATENT DOCUMENTS

| | | |
|---|---|---|
| JP | 05-041251 | 2/1993 |
| JP | 05-062712 | 3/1993 |
| JP | 07169508 | 7/1995 |
| JP | 07220760 | 8/1995 |

* cited by examiner

*Primary Examiner*—Patrick Ryan
*Assistant Examiner*—Tracy Dove
(74) *Attorney, Agent, or Firm*—Burr & Brown (57) ABSTRACT

A lithium secondary battery includes a battery case, an internal electrode body contained in the battery case and including a positive electrode, a negative electrode and a separator made of porous polymer, the positive electrode and the negative electrode are wound or laminated. A working volume ratio of the positive active material and the negative active material obtained by the positive active material weight being divided by the negative active material weight is within the range from 40% to 90% of the theoretical working volume ratio. The lithium secondary battery has high safety as well as high energy density by controlling the working volume of an electrode active material and the dispersion of the distribution of the working volume and in particular is preferably used for a drive motor of an electric vehicle.

14 Claims, 4 Drawing Sheets

BATTERIES HAVING DESIRED WORKING VOLUME RATIOS OF POSITIVE AND NEGATIVE MATERIALS

This is a division of application Ser. No. 09/272,909, filed Mar. 19, 1999, now U.S. Pat. No. 6,506,515.

BACKGROUND OF THE INVENTION AND RELATED ART STATEMENT

The present invention relates to a lithium secondary battery which has extremely high safety as well as high energy density and in particular is preferably used for the drive motor of an electric vehicle.

In recent years, regulation of emissions of carbon dioxide has been highly demanded, with the environment protection movement reaching its heights in the background. The automobile industry, to replace automobiles using fossil fuels, such as vehicles driven by gasoline, is proceeding in earnest with development of motor-drive batteries that will be the key to putting EV into practical use with the aim of promoting the introduction of electric vehicles (EV) and hybrid electric vehicles (HEV).

As a battery for such EV and HEV, in recent years, attention has been paid to lithium secondary batteries with high energy density, which enables them to extend the running distance per charge compared to use of lead storage batteries or nickel hydrogen batteries.

In a lithium secondary battery, a lithium compound is used as a positive active material, while various carbon materials are used as a negative active material, and an organic solvent in which a lithium ion electrolyte is dissolved is used as an electrolyte solution, which constitutes the battery. At charging, lithium ions in the positive active material are transferred from the positive active material to the negative active material in the electrolyte solution, permeating a porous separator separating the positive active material and the negative active material. At discharge, on the other hand, the lithium which was captured by the negative active material is ionized and transferred to the positive active material, thus conducting charging/discharging.

Here, since a lithium secondary battery has a large energy density compared to a conventional secondary battery, strict guidelines are provided with regard to its safety. For example, according to the "Lithium Secondary Battery Safety Assessment Standard Guidelines (commonly called the SBA Guidelines)" issued by the Battery Association of Japan, a lithium secondary battery is required not to burst, nor catch on fire even if the entire amount of energy that was fully charged to its charging capacity were to be instantly discharged by an external short circuit or an internal short circuit caused by a nail (metal rod) piercing test, etc., giving rise to heat in the battery.

An internal short circuit similar to the above-described nail piercing test, may occur due to the fact that the appropriate quantity of working volume (filling weight) for the electrode active material has not been determined. Practically during the reaction at the time of charging, when lithium ions in the positive active material are captured by the negative active material, if the lithium ions are supplied in a quantity surpassing the lithium holding capacity (the lithium charge/discharge capacity, hereafter referred to as the "charge/discharge capacity") possessed by the negative active material, metal lithium will be deposited on the surface of the negative active material. Deposition of this metal lithium may then cause dendrite growth, which could result in a short circuit between the positive active material and the negative active material. This dendrite growth is especially apt to occur at the first charging.

When an internal short circuit occurs due to this dendrite, as in the nail piercing test, the energy stored in the negative active material is immediately discharged, resulting in a thermal increase in the battery together with an internal pressure increase. In the worst case, the battery may burst or catch on fire. Since the quantity of energy to be stored in a lithium secondary battery with a large capacity for EV and the like is large, such an internal short circuit could lead to a deadly accident.

On the other hand, it is possible to make the charge/discharge capacity of the negative active material larger than the charge/discharge capacity of the positive active material in order to prevent the occurrence of such dendrite growth by metal lithium. However, unnecessary filling of the negative active material to an extreme extent is not preferred since it may decrease the energy density of the battery.

Accordingly, in theory, equalizing the charge/discharge capacity of the negative active material and the positive active material could make the energy density larger. Therefore, in forming a compact lithium secondary battery for conventional handy electronic equipment and the like, attention has been paid to this point, and design has been conducted by considering the entire working volume ratio of the positive and negative electrodes. Incidentally, the working volume ratio is the ratio of the positive and negative active materials defined as the value that is the working volume of the positive active material divided by the working volume of the negative active material.

However, a large capacity lithium secondary battery for EV and the like formed based on such a design principle leads to the problem that the rate of faulty product may be excessive. Regarding this problem, the present inventors thought that in a large capacity lithium secondary battery, the working volume ratio of the positive and negative active materials should be set to a sufficiently safe value so that dendrite growth of lithium metal would not occur across the entire charging/discharging region where the positive and negative electrodes face the other since the electrodes area is extremely large compared to a conventional compact lithium secondary battery.

That is, it is also thought to be of necessity to consider partial dispersion of the working volume ratios of the positive and negative active materials in each positive and negative electrode within a certain battery, namely the distribution of dispersion of the partial working volume ratios at each positive and negative electrode, such as spotted thickness of electrode active material layers and looseness/tightness of the filling state.

SUMMARY OF THE INVENTION

The present invention was achieved by considering the problems of the prior art mentioned above. That is, according to the present invention, there is provided a lithium secondary battery, comprising: a battery case, and an internal electrode body contained in the battery case and including a positive electrode, a negative electrode and a separator made of porous polymer, the positive electrode and the negative electrode being wound or laminated so that the positive electrode and negative electrode are not brought into direct contact with each other via the separator, wherein a working volume ratio of the positive active material and the negative active material obtained by the positive active material weight being divided by the negative active material weight is within the range from 40% to 90% of the theoretical working volume ratio.

According to the present invention, there is further provided a lithium secondary battery comprising: a battery case, and an internal electrode body contained in the battery case and including a positive electrode, a negative electrode and a separator made of porous polymer, the positive electrode and the negative electrode being wound or laminated so that the positive electrode and negative electrode are not brought into direct contact with each other via the separator, wherein the minimum value of the working volume ratio of the positive and negative active materials is regarded as an experimental safe working volume ratio $X_3$ when the usage rate of the negative electrode is 100%, and the electrode areas of the positive and negative electrodes are divided into n elements respectively, yielding a ratio of the average value of working volume weight of the positive and negative active materials at the elements to be regarded as an average working volume ratio $X_{av}$ while the working volume weight of the positive and negative active materials constitutes a normal distribution of dispersion σ, and, the faulty rate of batteries using the elements is expressed with an upper probability Q(u) (where u=$(X_3-X_{av})$/σ) of the normal distribution, then, n×Q(u) being the faulty rate of the lithium secondary battery is set to be 1 ppm or less.

In such a lithium secondary battery of the present invention, the difference between the average working volume ratio $X_{av}$ and the experimental safe working volume ratio $X_3$ is preferably no less than 6 times the dispersion σ, and further preferably no less than 6 times and no more than 20 times the dispersion σ. In addition, where the ratio of the positive and negative active material weights when the charge/discharge capacity of the positive and negative materials is equal is regarded as the theoretical working volume ratio $X_1$, the difference between the average working volume ratio $X_{av}$ and the theoretical working volume ratio $X_1$ is preferably no less than 11 times the dispersion σ and further preferably no less than 11 times and no more than 30 times the dispersion σ.

Such a lithium secondary battery of the present invention is preferably adopted to a battery whose battery capacitance is no less than 5 Ah, and is preferably used for an electric vehicle or a hybrid electric vehicle.

BRIEF DESCRIPTION OF THE INVENTION

DETAILED DESCRIPTION OF PREFERRED EMBODIMENTS

As described above, a lithium secondary battery of the present invention ensures a high level of safety and has a high energy density, since the working volumes of the electrode active material as well as the dispersion of distribution of working volumes across the entire charging/discharging regions within the internal electrode body is controlled.

The embodiments of the present invention are described below. However, it goes without saying that the present invention shall not be limited to the embodiments below.

Figure 1:
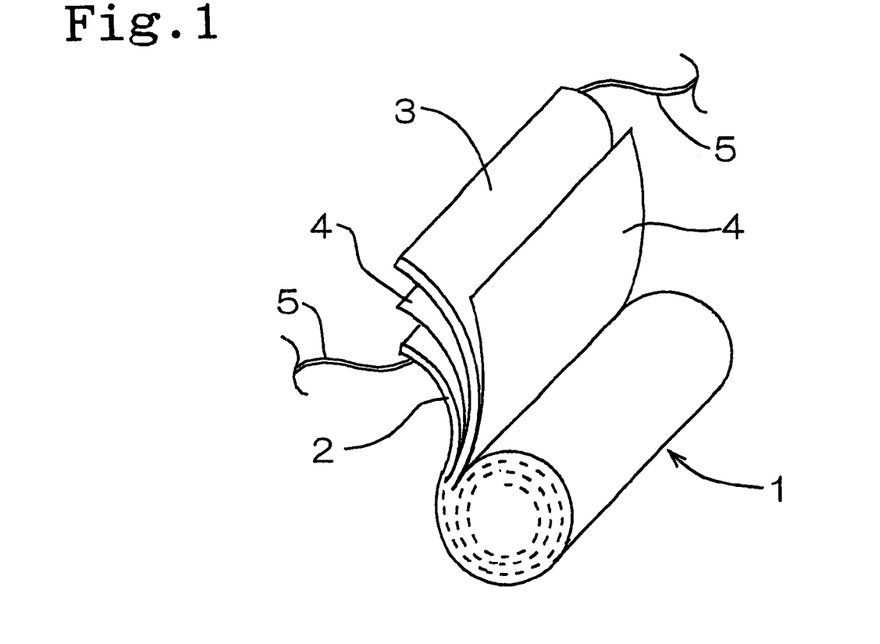
FIG. 1 is a perspective view showing the structure of a wound-type internal electrode body.

The internal electrode body of the lithium secondary battery of the present invention (hereinafter referred to as "battery") comprises a positive electrode, a negative electrode and a separator made of porous polymer film, the positive electrode and the negative electrode being wound or laminated so that the positive electrode and negative electrode are not brought into direct contact with each other via the separator. In particular, as shown in FIG. 1, a wound-type internal electrode body 1 is formed by winding a positive electrode 2 and a negative electrode 3 having a separator 4 in between, and a lead line 5 is provided for each electrode 2, 3.

Figure 2:
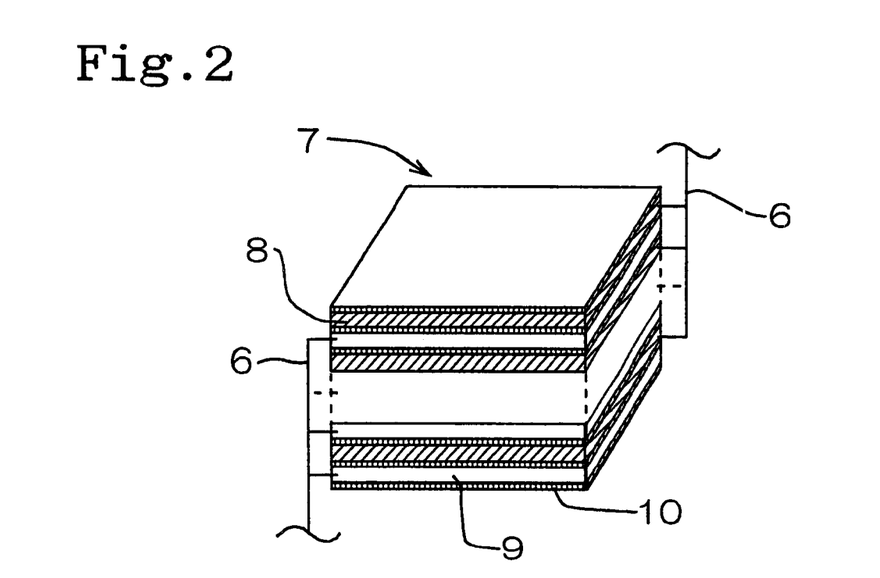
FIG. 2 is a perspective view showing one embodiment of the structure of a lamination-type internal electrode body.

On the other hand, as shown in FIG. 2, the lamination-type internal electrode body 7 laminates the positive electrode 8 and the negative electrode 9 alternately via the separator 10, with lead lines 6 being connected to each of the positive and negative electrodes 8, 9 respectively. Such internal electrode bodies 1, 7 are basically configured to have a plurality of element batteries connected in parallel, the element battery consisting of a positive electrode and a negative electrode facing each other. The positive electrodes 2, 8 and the negative electrodes 3, 9 are formed in the shape of a thin plate with an electrode active material coated respectively onto aluminum foil and copper foil as base members.

Figure 3:
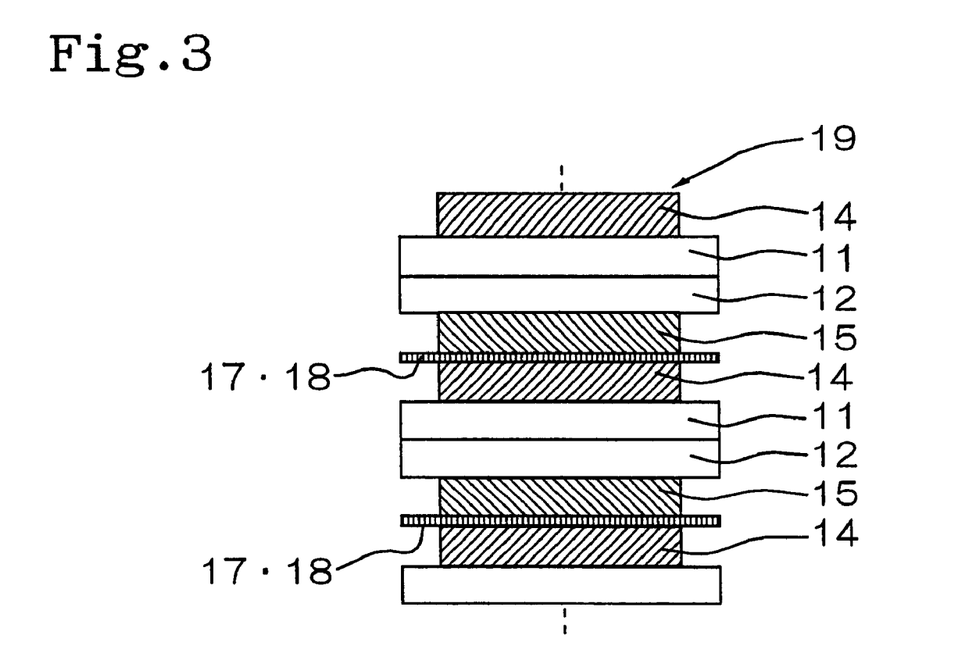
FIG. 3 is a cross-sectional view showing another embodiment of the structure of a lamination-type internal electrode body.

On the other hand, an internal electrode body 19 with a lamination structure shown in the sectional view of FIG. 3 is configured having a positive active material layer 14 formed on one surface of a plate-like or foil-state positive base member 11 and a negative active material layer 15 formed on one surface of a negative base member 12, with the surfaces where the respective electrode active material layers are not formed with respect to each electrode basic member 11, 12 being electrically connected. In addition, a surface of a positive active material layer 14 and a surface of a negative active material layer 15 are laminated to face each other through a separator 17 or a solid electrolyte 18 by laminating a plurality of electrodes. The internal electrode body 19 in this case is configured so that the element batteries are connected in series, unlike the above-described internal electrode bodies 1, 7.

For a battery with any of the above-described structures, lithium transition metal compound oxides such as lithium cobalt oxide ($LiCoO_2$), lithium nickel oxide ($LiNiO_2$), or lithium manganese oxide ($LiMn_2O_4$), etc., are generally used as a positive active material. In addition, in order to improve the conductivity of these positive active materials, it is frequently the case that a carbon powder such as acetylene black, graphite powder, etc., is mixed with the electrode active material. On the other hand, for the negative active material, an amorphous carbon material such as soft carbon or hard carbon, or carbon powder such as natural graphite, etc., is used.

As a separator 4 and the like, it is preferable to use a three-layer structural one in which a polyethylene film having lithium ion permeability and including micropores is sandwiched between porous polypropylene films having lithium ion permeability. This serves also as a safety mechanism in which, when the temperature of the internal electrode body is raised, the polyethylene film is softened at about 130° C. so that the micropores collapse to suppress the movement of lithium ions, that is, battery reaction. With this polyethylene film being sandwiched between polypropylene films having a softening temperature higher than the polyethylene film, it is possible to prevent contact/welding between the positive electrode 2 and the negative electrode 3.

In forming a battery using such members, at first, it is extremely important to know the extent of the lithium capacity of the positive and a negative active materials when the battery capacity is determined and when the weight per unit area of the electrode active material layer to be formed on each positive and negative electrode is determined.

Therefore, at first, the capacity per unit weight of the positive active material in the initial charging, namely the quantity of lithium ions dissociated in initial charging, is defined as the positive capacity ($C_c$). The capacity per unit weight of the negative active material in the initial charging, namely the quantity of lithium ions inserted in initial charging, is defined as the negative capacity ($C_a$). Thus, units for positive capacity as well as for negative capacity is expressed in "Ah/g." Each positive and negative capacity is measurable, for example, by forming a coin cell using metal lithium at the respective opposite electrodes.

In particular, the positive capacity is determined as the initial charging capacity to be obtained, using metal lithium on the opposite electrode, and conducting constant current-constant voltage charging at a charging voltage in the case of using a battery, for example 4.1V. On the other hand, the negative capacity is determined as the initial charging amount to be obtained, using metal lithium on the opposite electrode and inserting lithium ions at constant current-constant voltage (5 mV). Incidentally, here, in the case where metal lithium is used on the opposite electrode, in terms of capacity measurement of the negative active material, it is a discharge reaction. Nevertheless it is expressed as charging in correspondence with the case it was used as a battery.

Based on the thus-obtained positive capacity and negative capacity, expressing the working volume of the positive active material in a certain battery as $W_c(g)$, and the working volume of the negative active material as $W_a(g)$, defining $W_c/W_a$ as the ratio as a working volume ratio×where the working volume of positive active material was divided by the working volume of negative active material, and further defining the working volume ratio of each positive and negative active material as theoretical working volume ratio $X_1$ where at initial charging, the capacity of the whole positive electrode (unit: Ah) equals to the capacity of the whole negative electrode (unit: Ah), namely, constituting the following relationship:

$$C_c \cdot W_c = C_a \cdot W_a,$$

then, $X_1$ is expressed as follows:

$$X_1 = W_c/W_a (=C_a/C_c)$$

Accordingly, the theoretical working volume ratio $X_1$ varies in accordance with the positive and negative capacity if the positive and negative active materials used differ.

Next, using positive and negative active materials with a clearly determined theoretical working volume ratio $X_1$, measuring the battery capacity and output by actually forming coin cells with a diameter of 20 mm having various working volume ratios X, so as to determine the lowest value $X_2$ for the working volume ratio (hereafter referred to as the "lowest working volume ratio $X_2$") which enables the battery to be put to practical use, as well as the uppermost value $X_3$ for the working volume (hereafter referred to as the "experimental safe working volume ratio $X_3$") with which safety is experimentally ensured. As an example, here, a test was conducted under a material system using lithium cobalt oxide ($LiCoO_2$) as a positive active material and highly graphitized carbon fiber as a negative active material (hereafter the said material system will be referred to as "material system 1"). The results of this is shown in FIG. 4 and FIG. 5.

Figure 4:
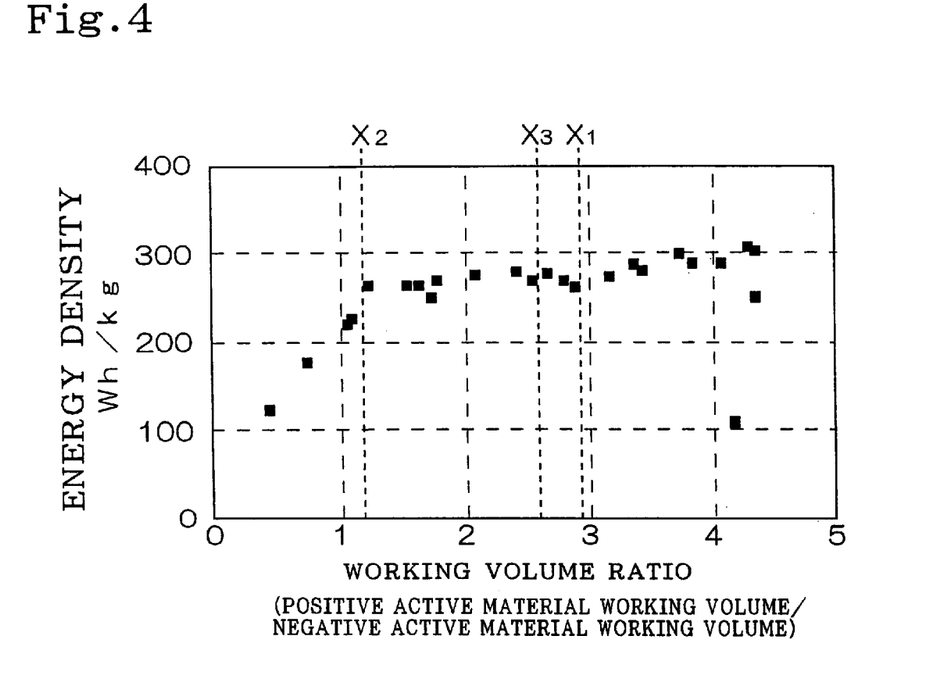
FIG. 4 is an explanatory view showing an example of a relationship between the working volume ratio of each positive and negative active material and energy density in a lithium secondary battery.

FIG. 4 is a graph showing the correlation between working volume ratio X and energy density. Here, energy density is determined by dividing the obtained discharging energy by total weight of the positive and negative active materials, under the condition that the quantities of the positive and negative active materials only were considered, and not the battery weight, including the weight of the battery case, etc. The theoretical working volume ratio $X_1$ in the said example is 2.92. In addition, with a working volume ratio of not less than 1.2, energy density scarcely depends on the working volume ratio, and thus can be regarded as almost constant. On the other hand, with a working volume ratio of no more than 1.2, a steep drop in energy density is observed. Thus, in this example, the lowest working volume ratio $X_2$ that enables the battery to be put into practical use is 1.2, this lowest working volume ratio $X_2$ being equivalent to 41% of the theoretical working volume ratio $X_1$.

Figure 5:
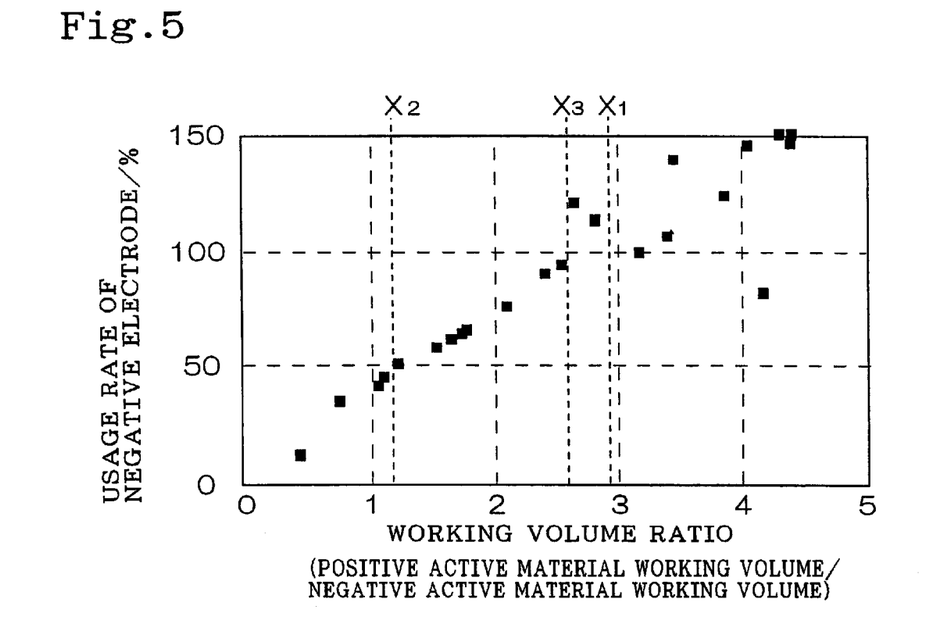
FIG. 5 is an explanatory view showing an example of the relationship between the working volume ratio of positive and negative active materials and the usage rate of a negative electrode in a lithium secondary battery.

FIG. 5 is a graph showing the relationship between the working volume ratio X and the usage rate of the negative electrode. Based on this it will be judged whether or not there is any possibility of lithium dendrite growth occurring. That is, in the case where the initial charging capacity obtained in a coin cell is greater than the entire negative capacity to be determined as the negative capacity $C_a$ multiplied by filling quantity $W_a$ of a negative active material (or $C_a \times W_a$), telling that lithium ions surpassing the lithium holding quantity of the negative active material have been supplied, one can judge that there is a possibility that lithium dendrite growth should happen.

Based on this judgment technique, in the theoretical working volume ratio $X_1$, the initial charging quantity coincides with the entire negative capacity. That is, the usage rate of the negative electrode obtained by dividing the initial charging quantity by the entire negative capacity must be 100% at the theoretical working volume ratio $X_1$. Actually, however, the usage rate of the negative electrode surpasses 100% even with a ratio of no more than the theoretical working volume ratio $X_1$.

Such results may be due to growth of lithium dendrite in regions such that the working volume ratio on the surface of the electrodes has deviated to some extent and that there are regions partially surpassing the theoretical working volume ratio $X_1$ even if the averaged working volume ratio, namely the working volume ratio for the entire coin cell, is no more than the theoretical working volume ratio $X_1$. Thus, from FIG. 5, the experimental safe working volume ratio $X_3$ is judged to be 2.6. This experimental safe working volume ratio $X_3$ is equivalent to 89% of the theoretical working volume ratio $X_1$.

Figure 6:
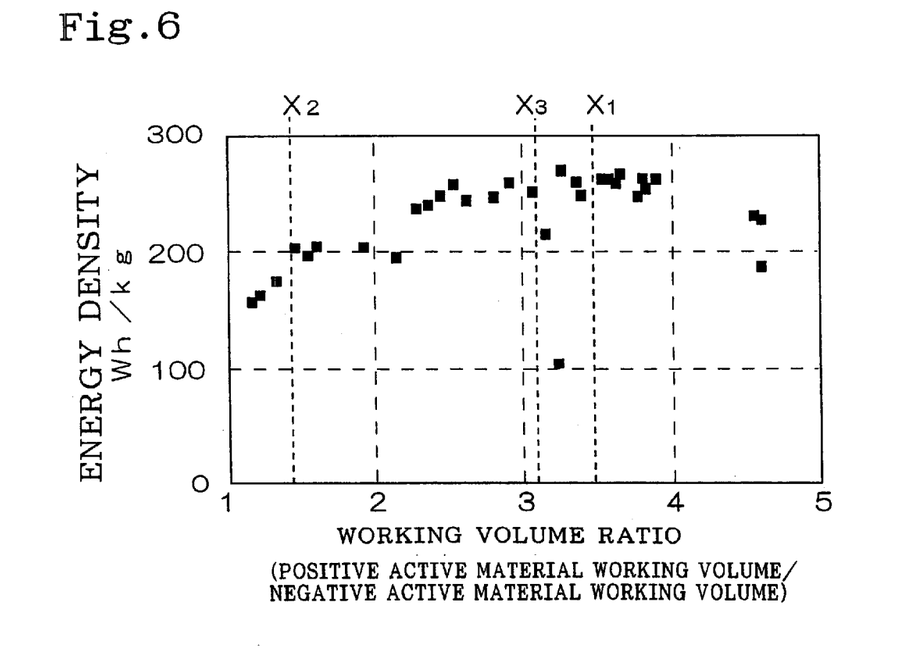
FIG. 6 is an explanatory view showing another example of the relationship between the working volume ratio of positive and negative active materials and energy density in a lithium secondary battery.
Figure 7:
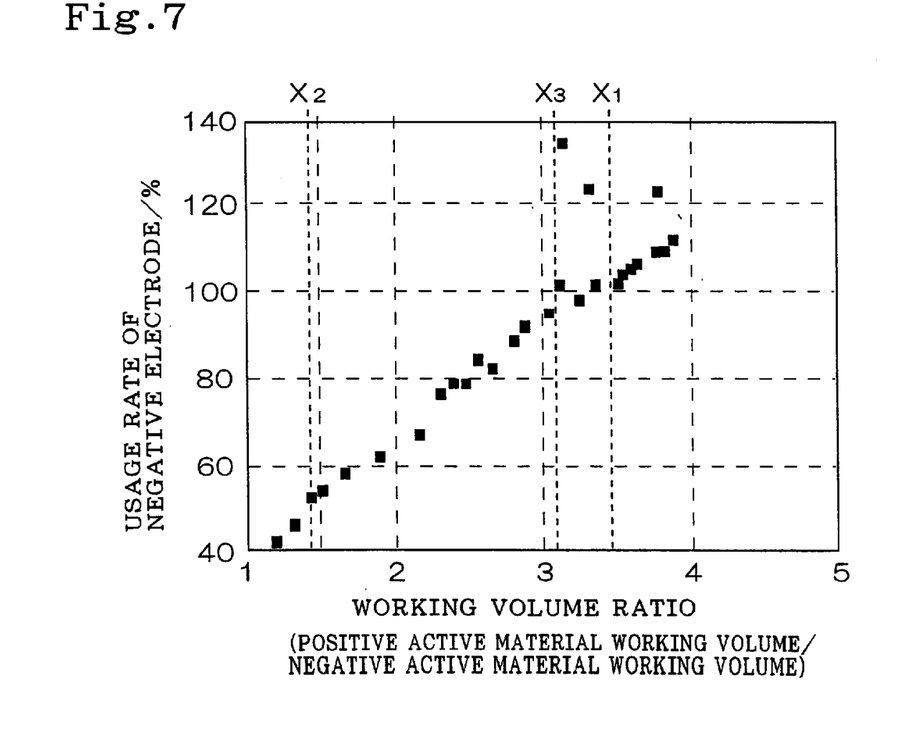
FIG. 7 is an explanatory view showing another example of the relationship between the working volume ratio of positive and negative active materials and the usage rate of the negative electrode in a lithium secondary battery.

Next, the results of a test that took place similarly to the above-described tests as another example under a material system using $LiCoO_2$ as positive active material and hard carbon as negative active material (hereafter referred to as "material system 2") are shown in FIG. 6 and FIG. 7. The test results shown in FIG. 6 and FIG. 7 are similar to those in FIG. 4 and FIG. 5. The theoretical working volume ratio $X_1$ in the present example is 3.46. However, from FIG. 6 and FIG. 7, the lowest working volume ratio $X_2$ is judged to be 1.40 and the experimental safe working volume ratio $X_3$ to be 3.10. Thus, the lowest working volume ratio $X_2$ and the experimental safe working volume ratio $X_3$ are respectively 40% and 90% of the theoretical working volume ratio $X_1$.

Thus, even if the positive and negative active materials are different, since the lowest working volume ratio $X_2$ is around 40% of the theoretical working volume ratio $X_1$, and the experimental safe working volume ratio $X_3$ is around 90% of the theoretical working volume ratio $X_1$, the working volume ratio X in forming the battery may be set between this lowest working volume ratio $X_2$ and the experimental safe working volume ratio $X_3$, enabling higher energy density and safety to coexist.

Next, based on the above-described knowledge, a case in which the electrode area is far broader than that in a coin cell, like an electrode used in a battery for an EV, etc., is considered. Here, in the case where an electrode with a large area is formed, the working volume ratios of each positive and negative active material will have a degree of dispersion depending on the accuracy of the electrode active material coating machine employed. Also within a single electrode sheet, it may be impossible to avoid the occurrence of regions having partially different quantities of coating of electrode active material, such as places where there is unevenness in the coating state or portions where there are differences in thickness of electrode active material and the like. Under the circumstances, it is necessary to consider such dispersion statistically.

In order to examine the dispersion of partial working volume within an electrode with such a large area, an electrode is formed in which positive and negative active materials have been coated on one side of a metal foil, aiming at a certain working volume ratio $X_t$. The electrode to be formed preferably has the same area as those for use in a large capacity battery planned to be actually used or an area even larger than that. Incidentally, the reason why only one surface of the metal foil is coated with an electrode active material is that dispersion taking place in the coating state on one surface may be set off by dispersion on the other surface side when both the surfaces are coated.

Next, circle plates with the same diameter of 20 mm as that of a coin cell are formed by punching as many as possible at random from an electrode, and the dispersion of their weights is examined. Here, the weight of the metal foil on each of the punched circle plates is deemed to be a constant, and weight dispersion is deemed to be due to the electrode active material coated thereon. Regarding the weight distribution obtained on an electrode active material as being a normal distribution, the weight average value $W_{c-av}$ of a positive active material and its dispersion $\sigma_c$ as well as the weight average value $W_{a-av}$ of a negative active material and its dispersion $\sigma_a$ are determined.

Thus the obtained $W_{c-av}, \sigma_c, W_{a-av},$ and $\sigma_a$ express the average working volume ratio $X_{av}$ and dispersion $\sigma$ in a battery as follows:

$$X_{av} = W_{c-av}/W_{a-av}$$

$$\sigma = (W_{a-av}^2 \sigma_c^2 + W_{c-av}^2 \sigma_a^2)/W_{a-av}^4$$

Here, the average working volume ratio $X_{av}$ is exactly the average working volume ratio in the circle plates obtained by punching. However, since this average working volume ratio $X_{av}$ may be considered to be the same as the average working volume ratio in the battery, these will be treated equally below.

Here, a large size battery for an EV and the like can be considered to be configured by element batteries with a normal distribution comprising the above-described average working volume ratio $X_{av}$ and dispersion $\sigma$, in the above-described example, element batteries of a diameter 20 mm and area of 3.14 $cm^2$ in the quantity of entire electrode area divided by the area of an element battery, being connected in parallel. In the case where any one of them surpasses the experimental safe working volume ratio $X_3$ mentioned before, it is judged that there exists a risk in the battery of internal short circuit due to lithium dendrite growth. In that case, considering the above-described normal distribution, in theory it is impossible statistically to make the faulty rate completely null, but in practical terms, it is possible to make the faulty rate null.

That is, it will be fine if the difference between the average working volume ratio $X_{av}$ and the experimental safe working volume ratio $X_3$ is statistically larger than the dispersion $\sigma$ to a sufficient extent. On the other hand, for example, considering a battery for an EV, since the faulty rate of the battery is required to be no more than 1 ppm, in this case, it is advisable to set the value of the electrode area per a battery divided by the area of element battery so that the value is multiplied by the faulty rate of the element battery, the resulting value being no more than 1 ppm. The idea of ensuring safety in such a battery maybe expressed in an established form as follows.

That is, for each positive and negative active material, the charging/discharging capacities of each positive and negative active material in batteries respectively and independently formed with metal lithium to be used as the opposite electrodes are determined. Next, the weight ratio of each positive and negative active material giving the upper limit to make the usage rate of negative electrode in the battery formed based on the obtained charge/discharge capacity 100% is deemed to be the experimental safe working volume ratio $X_3$. By dividing the electrode area of each positive and negative electrode in one battery using that each positive and negative active material into n elements, the ratio of the average value of the weight distribution of each positive and negative active material coated on each element is deemed to be an average working volume ratio $X_{av}$, and $\sigma$ is deemed to be the dispersion when the weight distribution takes normal distribution. Under the conditions, when the upper probability Q(u) of the normal distribution being the faulty rate of batteries formed using each element satisfies the following relation:

$$Q(u) \times n \leq 1 \text{ ppm (where, } u=(X_3-X_{av})/\sigma),$$

the faulty rate of a battery can be suppressed to no more than 1 ppm. Incidentally, "$u(=(X_3-X_{av})/\sigma)$" is a parameter, a so-called standard deviation, showing how much $\sigma$ a deviation is placed from the average with dispersion $\sigma$ as a unit.

Based on the idea of ensuring safety in such a battery, for both of the above-described material system 1 and material system 2, electrodes for a 20 Ah battery were formed using a reverse coater. For the material system 1, 2, 100 circle plates with diameter of 20 mm were formed by punching. The average working volume ratio $X_{av}$ as well as dispersion $\sigma$ was thus determined. As a result, for both material systems 1, 2, the dispersion $\sigma$ of the average working volume ratios was 0.07. Here, since the actual area of an electrode for 20 Ah is around 12600 $cm^2$, with the number of elements n calculated to be 4013(=12600/3.14), thus no less than 6.2σ is to be necessary, calculated from a normal distribution function, in order to make the upper probability (the faulty rate) of normal distribution to be no more than 1 ppm. That is, it will be fine if the average working volume ratio $X_{av}$ keeps a distance of no less than 6.2×0.07 from the experimental safe working volume ratio $X_3$, and with this an extremely highly safe battery will be realized.

In addition, since the difference between the theoretical working volume ratio $X_1$ and the experimental safe working volume ratio $X_3$ is 0.32 (4.6σ) for the material system 1 and is 0.36 (5.1σ) for the material system 2, as shown in formerly described FIGS. 4 through 7, it will be fine if the average working volume ratio $X_{av}$ keeps a distance of no less than around approximately 11σ, which is reached by the addition of 6.2σ, the difference between the average working volume ratio $X_{av}$ and the experimental safe working volume ratio $X_3$, from the theoretical working volume ratio $X_1$.

Moreover, since the difference between the experimental safe working volume ratio $X_3$ and the lowest working volume ratio $X_2$ is 1.4 for the material system 1 and 1.7 for the material system 2, as shown in formerly described FIGS. 4 through 7, the difference of these is respectively equivalent to 20σ and 24.3σ. Accordingly, since it is a battery using electrodes to be formed under the present conditions, with the average working volume ratio $X_{av}$ keeping a range of a distance no less than 6.2σ but no more than 20σ from the experimental working volume ratio $X_3$, it is possible to realize a highly safe battery while maintaining a high energy density.

Here, in addition, since the difference between the theoretical working volume ratio $X_1$ and the lowest working volume ratio $X_2$ is 2.72 (38.9σ) for the material system 1 and 2.06 (29.4σ) for the material system 2, as in FIGS. 4 through 7, if the difference between the average working volume ratio $X_{av}$ and theoretical working volume ratio $X_1$ remains no less than 11σ but no more than 30σ, safety will be ensured.

Although the safety of a battery is ensured as described above, preferably, it is necessary to see to it that no statistical drop in energy density of element batteries will occur. That is, it is necessary for the average working volume ratio $X_{av}$ of a battery to keep a sufficient distance from the lowest working volume ratio $X_2$ as well. This difference is also 6.2σ since the way of ensuring safety remains the same as described above. Therefore, with the difference between the average working volume ratio $X_{av}$ and the experimental working volume ratio $X_3$ of a battery being no less than 6σ but no more than 14σ, it is possible to make high energy density with greater homogeneity coexist with high safety. In other words, it will be fine if the difference between the average working volume ratio $X_{av}$ and the theoretical working volume ratio $X_1$ is between 11σ and 24σ.

As described above, a lithium secondary battery according to the present invention has excellent safety and produces a remarkable effect making it possible to obtain a battery with high energy density since the average working volume ratio value of the electrode active material is justified, by considering dispersion of the distribution of the electrode active material in the electrode.

What is claimed is:

1. A method of making a lithium secondary battery comprising a battery case and an internal electrode body contained in the battery case and including a positive electrode comprising a foil of a first metal having a positive active material coated thereon, and a negative electrode comprising a foil of a second metal having a negative active material coated thereon, and a separator made of porous polymer, the positive electrode and the negative electrode being wound or laminated so that the positive electrode and the negative electrode are not brought into direct contact with each other via the separator, the method comprising:

preparing a negative electrode and a positive electrode each by coating one surface of a foil with either a negative active material or a positive active material based on a given experimental safe working volume ratio $X_3$ aiming at a working volume ratio $X_1$, punching a plurality of plates from said negative and positive electrodes, weighing each of said plates in order to calculate an average weight of the coated negative material $W_{a-av}$, an average weight of positive active electrode material $W_{c-av}$, a dispersion in the weights of the coated negative material $\sigma_a$, a dispersion in the weights of the coated positive material $\sigma_c$, respectively, and σ wherein $\sigma = (W_{a-av}^2 \sigma_c^2 + W_{c-av}^2 \sigma_a^2)/W_{a-av}^4$ calculating Q(u) based on the thus obtained data wherein $u = (X_3 - X_{av})/\sigma$, $X_{av}$ is $W_{c-av}/W_{a-av}$, and Q(u) satisfies the equation:

$Q(u) \times n = 1$ ppm, wherein n is a number of elements to be divided and Q(u) has the same meaning as mentioned above, and preparing negative and positive plates, respectively using thus obtained Q(u) for actual production.

2. A method as recited in claim 1, wherein said experimental safe working volume ratio $X_3$ is obtained by determining a lithium capacity of a positive active material using a lithium electrode as an opposite electrode and a lithium capacity of a negative active material using said lithium electrode as an opposite electrode, calculating a theoretical working volume ratio $X_1$ based on an equation:

$X_1 = W_c/W_a$ wherein $W_c$ denotes a working volume of a positive electrode and $W_a$ denotes a working volume of a negative electrode based on said lithium capacity of said positive active material and said lithium capacity of said negative active material, preparing a plurality of coin cells comprising each of positive electrodes and negative electrodes by coating a positive active material and a negative active material on surfaces of respective metal foils, and determining an output of each of the respective coin cells so as to obtain said experimental safe working volume ratio $X_3$.

3. A method as recited in clam 1, further comprising comparing (1) a difference between said average working volume ratio $X_{av}$ and said experimental safe working volume ratio $X_3$ with (2) a value of 6 times said dispersion s and (3) a value of 20 times said dispersion σ.

4. A method as recited in claim 1, further comprising comparing (1) a difference between said average working volume ratio $X_{av}$ and a theoretical working volume ratio $X_1$ equal to a ratio of a capacity per weight $C_a$ of said negative material divided by a capacity per weight $C_c$ of said positive material with (2) a value of 11 times said dispersion σ.

5. A method as recited in claim 1, further comprising comparing (1) a difference between said average working volume ratio $X_{av}$ and a theoretical working volume ratio $X_1$ equal to a ratio of a capacity per weight $C_a$ of said negative material divided by a capacity per weight $C_c$ of said positive material with (2) a value of 11 times said dispersion $\sigma$ and (3) a value of 30 times said dispersion $\sigma$.

6. A method as recited in claim 1, wherein said battery has a capacity of 5 Ah or more.

7. A method as recited in claim 1, wherein said battery is used for an electric vehicle or a hybrid electric vehicle.

8. A method of making a lithium secondary battery comprising a battery case and an internal electrode body contained in the battery case and including a positive electrode comprising a foil of a first metal having a positive active material coated thereon, a negative electrode comprising a foil of a second metal having a negative active material coated thereon, and a separator made of porous polymer, the positive electrode and the negative electrode being wound or laminated so that the positive electrode and the negative electrode are not brought into direct contact with each other via the separator, the method comprising:

testing a negative test cell made of a foil of said second metal having said negative active material coated thereon to determine a capacity of said negative test cell, said negative active material of said negative test cell having a negative active material weight;

testing at least one positive test cell made of a foil of said first metal having said positive active material coated thereon to determine a weight of said positive active material at which said positive test cell has a capacity equal to said capacity of said negative test cell;

calculating an experimental safe working volume ratio $X_3$ equal to a ratio of said weight of said positive active material divided by said negative active material weight;

forming a negative electrode sheet comprising a foil of said second metal having a layer of said negative active material formed thereon, said negative electrode sheet having a surface area A;

forming a positive electrode sheet comprising a foil of said first metal having a layer of said positive active material formed thereon, said positive electrode sheet having a surface area A;

removing from said negative electrode sheet a plurality of negative cells which each have an area a;

removing from said positive electrode sheet a plurality of positive cells which each have an area a;

calculating an average weight $W_{a-av}$ of said negative cells;

calculating an average weight $W_{c-av}$ of said positive cells;

calculating an average working volume ratio $X_{av}$ equal to a ratio of said average weight $W_{c-av}$ of said positive cells divided by said average weight $W_{a-av}$ of said negative cells;

calculating a value n equal to a ratio of said surface area A divided by said area a; and calculating a product of said value n times Q(u) where u equals a ratio Of $(X_3-X_{av})$ divided by $\sigma$, where $\sigma$ equals a ratio of $(W_{c-av}^2\sigma_c^2+W_{c-av}^2\sigma_a^2)$ divided by $W_{c-av}^4$, $\sigma_a$ is a dispersion of the respective weights of said negative cells, and $\sigma_c$ is a dispersion of the respective weights of said positive cells.

9. A method as recited in claim 8, further comprising comparing (1) a difference between said average working volume ratio $X_{av}$ and said experimental safe working volume ratio $X_3$ with (2) a value of 6 times said dispersion $\sigma$.

10. A method as recited in claim 8, further comprising comparing (1) a difference between said average working volume ratio $X_{av}$, and said experimental safe working volume ratio $X_3$ with (2) a value of 6 times said dispersion $\sigma$ and (3) a value of 20 times said dispersion $\sigma$.

11. A method as recited in claim 8, further comprising comparing (1) a difference between said average working volume ratio $X_{av}$ and a theoretical working volume ratio $X_1$ equal to a ratio of a capacity per weight $C_a$ of said negative material divided by a capacity per weight $C_c$ of said positive material with (2) a value of 11 times said dispersion $\sigma$.

12. A method as recited in claim 8, further comprising comparing (1) a difference between said average working volume ratio $X_{av}$ and a theoretical working volume ratio $X_1$ equal to a ratio of a capacity per weight $C_a$ of said negative material divided by a capacity per weight $C_c$ of said positive material with (2) a value of 11 times said dispersion $\sigma$ and (3) a value of 30 times said dispersion $\sigma$.

13. A method as recited in claim 8, wherein said battery has a capacity of 5 Ah or more.

14. A method as recited in claim 8, wherein said battery is used for an electric vehicle or a hybrid electric vehicle.

* * * * *